United States Patent [19]
Coleman et al.

[11] 3,781,816
[45] Dec. 25, 1973

[54] AUTOMATIC PUBLICATIONS SYSTEMS AND METHOD

[75] Inventors: Aaron H. Coleman, Levittown, Pa.; Hugh W. Stewart, Princeton, N.J.

[73] Assignee: CPS Associates, Inc., Croydon, Pa.

[22] Filed: Apr. 10, 1972

[21] Appl. No.: 242,409

[52] U.S. Cl. .......................... 340/172.5, 340/324 A
[51] Int. Cl. .......................... G06f 3/14, G06k 15/00
[58] Field of Search .................... 340/172.5, 324 A; 178/DIG. 24

[56] References Cited

UNITED STATES PATENTS

| | | | |
|---|---|---|---|
| 3,248,705 | 4/1966 | Dammann | 340/172.5 |
| 3,382,487 | 5/1968 | Sharon | 340/172.5 |
| 3,500,338 | 3/1970 | Cuccio | 340/172.5 |
| 3,501,746 | 3/1970 | Vosbury | 340/172.5 |
| 3,559,182 | 1/1971 | Floret | 340/172.5 |
| 3,648,245 | 3/1972 | Dodds | 340/172.5 |
| 3,648,249 | 3/1972 | Goldsberry | 340/172.5 |
| 2,833,958 | 5/1968 | Pensak | 178/DIG. 24 X |
| 3,673,323 | 6/1972 | Gustafson | 178/DIG. 24 X |

*Primary Examiner*—Paul J. Henon
*Assistant Examiner*—Mark Edward Nusbaum
*Attorney*—Charles H. Howson, Jr. et al.

[57] ABSTRACT

An electronic photo-typesetting system employing a central computer-controlled electronic photo-typesetter and a plurality of remote publications-data input terminals. Final page proof is supplied substantially instantaneously to any requesting remote terminal by means of a scan converter at the central station, which supplies a proof-display device at the requesting terminal with electrical signals of relatively narrow bandwidth representing a lower-definition proof grade image of the final composed page.

23 Claims, 2 Drawing Figures

PATENTED DEC 25 1973 3,781,816

SHEET 1 OF 2

PATENTED DEC 25 1973 3,781,816

SHEET 2 OF 2

AUTOMATIC PUBLICATIONS SYSTEMS AND METHOD

BACKGROUND OF THE INVENTION

This invention relates to automated publication systems and methods, and particularly to electronic computer-controlled photo-typesetting systems and methods employing publications-data input terminals remote from the photo-type-setting appartus.

In the publication of documents an important step is the proofing of the document prior to final printing. In elementary publication systems this has been accomplished by printing one or several proof copies, reviewing them, editing them, and changing the typesetting to correct errors. Such procedures have been time-consuming and expensive.

More recently, electronic computer-controlled photo-typesetting publication systems have been developed in which an image of a page is painted on a cathode-ray tube screen by an electron beam, and the image photographed. See for example the article entitled "Typesetting" at pages 60–69 of the May 1969 issue of Scientific American. While proofing by the production of hard copy and its manual delivery to the editing station may be practical in connection with an electronic photo-typesetting system involving only a single station at which the data input and photo-typesetting equipment are both present, the relatively high cost of such photo-typesetting equipment makes it highly desirable to share it among a plurality of users at different remote locations by means of remote data-input terminals. For example, a number of publishers of different magazines may each have remote terminals in their offices which enable electrical input of the necessary publications data, which is then sent through a communications link to a common central station containing the computerized photo-typesetting apparatus. In such case, proofing by the production of hard copy and manual delivery of the copy to the data input location may involve delivery over long distances, for example hundreds or even thousands of miles where the input terminals are very remote from the central station. The resultant time delay of one or several days between input of publications data and the availability of proof copy would represent a severe limitation in such a system. This is particularly true in the common case in which a publications deadline is imminent, and revisions and corrections must therefore be made and proofed rapidly. Even when the urgency is not great, the efficiency of the publications process is greatly degraded if the person producing the publications data input must interrupt his work for a day or two each time he wishes to make a correction or to make a modification. The latter is particularly true in the graphic-arts publications field, wherein the aesthetic appearance of the page is important and it may be desired to compose and try out a number of different page compositions for viewing and comparison before selecting the one considered most pleasing.

Insofar as the content of the text itself is concerned, electrical typewriter apparatus is known which will magnetically store electrically typeritten information, enable typed-in correction of the stored data and, upon request, feed back corrected data to operate the electrical typewriter so it will type out hard copy for review and further editing. However, such apparatus will not provided proof copy at the electic typewriter showing the results of text composition or page composition, for example different type fonts, different line spacings, etc., and will not provide proof illustrations or photographs.

Accordingly, it is an object of the invention to provide a new and useful publications system and method of the electronic pcoto-typesetting class.

Another object is to provide such a system and method which includes provision for prompt remote proofing of the publications material.

A further object is to provide such a system and method in which prompt remote proofing is provided in an efficient manner.

Another object of the invention is to provide such a system and method in which the remotely-provided proof is that of the complete composed page, as it will be finally printed.

A further object is to provide such a system and method of the class comprising a plurality of remote publications data-input terminals and a common central publications station, wherein each terminal has the capability of effecting storage of input data in a memory device in the central station and correcting it as desired, and of controlling printout at the central station of the data so stored in central storage, and in which system accurate final proof is promptly and efficiently supplied to each such terminal.

Another object is to provide such a system and method in which the bandwidth required in the communications link connecting remote terminals to central is minimized, and the link and the central equipment time-shared in an efficient manner.

A further object is to provide such a system and method in which the image of which proof is obtained includes illustration as part of the fully-composed final page.

SUMMARY OF THE INVENTION

In accordance with the invention there is provided an automated publications system comprising a high-precision cathode-ray tube device for forming and displaying a high-definition image of a page suitable for photographing to provide a hard-copy reproduction of said image, computer means for supplying said tube with deflection and intensity-controlling signal to form said image on said tube, terminal means remote from said tube for supplying electrical signals to said computer means to cause it to effect formation of said image in accordance with information contained in said electrical signals, scan converter means remote from said terminal means and responsive to said electrical signals for producing output signals representing a lower-definition version of said image, and proof display means adjacent said terminal means responsive to said output signals for providing a proof display of said lower-definition version of said image.

In various preferred forms of the invention, one or more of the following features are employed in combination in the above-described system. The scan converter is preferably a cathode-ray tube scan converter, and the same electrical signals which form the image on the precision cathode ray tube are preferably applied to the scan converter upon the receipt of a proof-command signal from a remote terminal; the scan converter forms and stores a version of the high-definition image, and scans it to produce an output signal similar to the high-definition image, but of lower definition.

Preferably the latter scanning is of the facsimile type, and preferably the output signal is digitized and the information in it compressed before it is sent through the communications link. Also preferably, the output signal is momentarily stored in the memory of the computer device and read out therefrom at a relatively low rate, so that the transmission bandwidth required in the communications link is low, enabling the use of standard voice-grade communications lines. The scan converter means is preferably located adjacent the high-precision cathode-ray tube device, and the proof-display means is preferably located at the remote terminal to provide a proof-display for each such terminal. Preferably also, the proof display means comprises a proof-display cathode-ray tube of relatively long screen persistence so that although the output signal is applied thereto only momentarily, the proof-display image remains for a suitably long time of at least several minutes and typically about an hour, unless erased intentionally in the meantime. For those cases in which the output signal is digitized and compressed prior to transmission through the communications link, the proof-display means has associated with it suitable apparatus for expanding the information and decoding it into a suitable form for producing a remote cathode-ray tube proof-display corresponding to the high-definition image of a complete composed page at the central station, although of lower definition. The remote terminals preferably comprise input data means for supplying text-information input data, correction-instruction input data, text-composition input data, line-drawing input data, photographic-illustration input data, and page-composition input data, so that a complete, final, composed page is displayed on the high-precision cathode ray tube and a proof-display of the final composed page made available at each terminal.

It will be appreciated that, at each terminal, the operator may insert publications information, promptly receive a proof display of the corresponding page, and correct the text, the illustrations, and the page composition at will until the final desired, completely composed, page is produced, at each step having available to him a proof display to assist him in these operations. The system and method of the invention therefore greatly facilitates and expedites the publications process, minimizes the transmission bandwidth required to transmit the proof display so that ordinary voice-grade telephone lines may be used for the communications, and enables the proofing to be accomplished without substantially interfering with publications input, correction, and proofing in response to signals from other terminals.

BRIEF DESCRIPTION OF FIGURES

The invention will be more readily and fully understood from a consideration of the following detailed description, taken in connection with the accompanying drawings in which.

DETAILED DESCRIPTION OF SPECIFIC EMBODIMENTS

Figure 1:
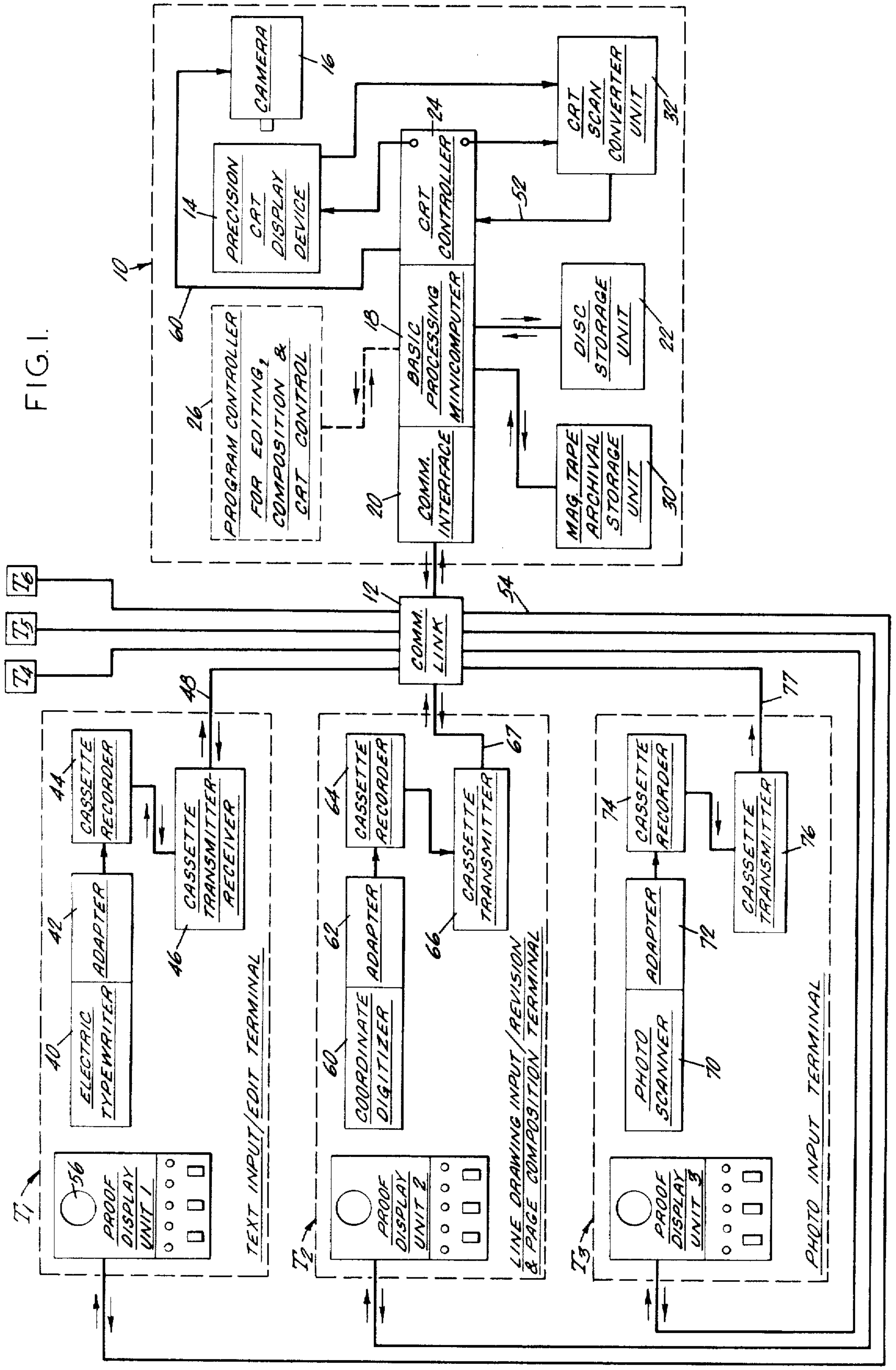
FIG. 1 is a block diagram of a publications system embodying the invention in one of its forms.

Referring now to the embodiments of the invention shown in the drawings by way of illustration only, in FIG. 1 there is shown a central station 10, a set of three publications data-input terminals $T_1$ , $T_2$ and $T_3$ , another group of three remote terminals $T_4$, $T_5$, and $T_6$ shown generally, and a communications link 12 which connects each of the remote terminals with the central station 10.

Central station 10 comprises an electronic computer-controlled photo-typesetting system which operates in response to publications input-data supplied thereto from the remote terminals such as $T_1$ through $T_6$. As an example, the central station 10 may be located in a major city, the remote terminals $T_1$, $T_2$ and $T_3$ may be located together in suburban offices of a publications company, and terminals $T_4$, $T_5$ and $T_6$ may be located together in a nearby town, or in another major city, in the offices of another publisher. It will be understood that many other terminals may be connected into this system and situated at a number of remote locations, wherever publications input is desired.

A high-quality image of a page to be printed is formed in the precision cathode-ray tube device 14 and, when it has been completely corrected and composed, is photographed by a camera 16 to produce paper or film hard-copy, which is processed in known manner to produce hard copy proof or printing plates, in known manner. The image formed on the precision CRT display device 14 is controlled by the basic processing mini-computer 18 which is supplied with publications input-data through the communications interface 20, and operates in conjunction with the associated disc storage unit 22, CRT controller 24 and the program controller 26 for editing, composition, and CRT control. The program controller 26 is shown in dashed outline since it is not a separate piece of hardware but is actually a function of the mini-computer; the blocks 18, 20, 22, 24 and 26 may be considered together as computer means controlling image formation in device 14. While the elements of the computer means typically are complex, the circuitry and devices required to produce the necessary functions thereof are well known in the art, and in the interest of clarity of exposition are not shown in detail.

Also present at the central station 10 are the magentic tape archival storage unit 30 and the CRT scan converter unit 32. Archival storage unit 30 is connected to the mini-computer 18 so as to provide long-term magnetic storage of the signals representing each completed page, so that the page will be available for reproduction at future times if desired. The CRT scan converter unit 32 is of the essence of the present invention in this embodiment, and its nature and operation will be described in detail hereinafter.

The signals sent to and from the remote terminal units and the central stations by way of the communications link 12 are of binary digital form, and of such bandwidth that they can be sent over ordinary voice-grade telephone lines. It will be understood that communications link 12 includes appropriate multiplexing, timing, priority control and similar communications circuits well known in the art, and the details of equipment for providing these functions are therefore not described herein in detail.

Terminal $T_1$ represents a text input/edit terminal which may be used as one of the publications data-input terminals of the system. In this example it comprises an electric typewriter 40, an adapter 42 for converting the electric typewriter signals into appropriate binary digital signals representing the keyboard characters, a cassette recorder 44 for recording the character-representing signals, and a cassette transmitter-receiver 46 which upon command will read out the stored signals in cassette recorder 44 and apply them to communications line 48 for transmission to central station 10. Cassette transmitter-receiver 46 also has the capability of receiving signals supplied to it over line 48 from central station 10, and recording them on cassette recorder 44. Each of the units 40, 42, 44 and 46 may be of conventional design, and hence is not described herein in detail.

Then the publications process is for text-only documents, the sequence may be as follows. The original manuscript is typed on electric typewriter 40, preferably on paper having pre-numbered lines. As it is typed, the adapter 42 supplies character-representing signals to cassette recorder 44, wherein these signals are magnetically stored. The operator then reviews the draft which he has typed on the electric typewriter. He then types his directions for correcting or changing the manuscript on the electric type-writer, using a code system to designate commands, which code will be recognized and acted upon by the mini-computer in the central station. In one example, about 16 edit commands are sufficient for most purposes. One code which can be employed to distinguish the commands from the text is to use a slant symbol superimposed on the first letter of the command words. It will be understood that at the beginning of the typing of a particular document, suitable Begin Document signals, a suitable identifying Document Number, and the identifying Page Number will normally be typed in by means of the typewriter 40. The directions for corrections are given by typing in the command or correction together with an identification of the document number, page number and line number.

Table 1 hereof indicates one suitable set of text input/edit commands which can be inserted by means of the electric typewriter.

TABLE 1: TEXT INPUT/EDIT COMMANDS

| | | | |
|---|---|---|---|
| 1. Begin Document* | BD | 9. Replace | R |
| 2. Begin Section*** | BS | 10. Insert | I |
| 3. Begin Page** | BP | 11. Delete | D |
| 4. Begin Correction* | BC | 12. Copy | C |
| 5. End Document* | ED | 13. Merge | M |
| 6. End Section*** | ES | 14. Scan Replace | SR |
| 7. End Page** | EP | 15. Scan Extract | SE |
| 8. End Correction* | EC | 16. Edit | E |

*Followed by document identification number; Followed by page number; *Followed by chapter identification number Table 2A hereof is an example of a typical original text-input with editing markup shown thereon; Table 2B shows typical correction commands which would be typed in at the electric typewriter to accomplish the editing called for in Table 2A, and Table 2C shows how the corresponding text will read after such corrections are made.

TABLE 2A (ORIGINAL INPUT AND EDITING MARKUP)

Begin Page 17

3. if this can be done more effectively by graphic methods,
10. of high reproduction quality. ~~Moreover, there shall be a major~~
11. consideration for quality. India ink, pencil, or other suitable
20. TECHNICAL DRAWINGS ← (Scan—Replace with Engineering Drawings)
22. Copy prints only of line drawings shall be furnished

TABLE 2G (TYPED CORRECTIONS)

1. Begin Correction No. 1, 1256
2. Replace 17, 3, aff, eff
3. Delete 17, 10, Moreover, quality
4. Scan Replace No. 1256, Technical Drawings, Engineering Drawings
5. Insert 17, 22, line, of
6. End Corrections No. 1, 1256

TABLE 2C (EDITED DRAFT)

3. if this can be done more effectively by graphic methods,
10. of high reproduction quality. India ink, pencil, or other suitable
19. ENGINEERING DRAWINGS
22. Copy prints only of line drawings shall be furnished Referring to Table 2B, line No. 1 identifies the document to be corrected as No. 1256. Line No. 2 refers to page 17, line 2, and calls for replacement of "affectively" with "effectively." Line No. 3 calls for deletion of the sentence on page 17, line 10, starting with the word "Moreover" and ending with the word "quality." Line No. 4 specifies that the entire document No. 1256 is to be scanned for the phrase "Technical Drawings"; when found, this phrase is to be replaced by the phrase "Engineering Drawings." Line No. 5 directs that the word "line" be inserted on page 17, line 22 after the word "of." Application of these corrections to page 17 yields the edited page shown in Table 2C.

It will be understood that the correction commands shown in Table 2B are typed at the end of the manuscript, on the electric typewriter, and as mentioned above are recorded in the cassette recorder at the end of the original text.

When all the correction commands have thus been typed and recorded, a typed-in "End Correction" command is transmitted through the circuitry of the cassette recorder 44 to the cassette transmitter-receiver 46, which responds by transmitting the data signals stored in cassette recorder 44 over line 48, through communication link 12, through communications interface 20, to basic processing mini-computer 18 and to the disc storage unit 22, wherein the signals are stored as binary digital data. The "End Correction" signal then commands the program controller 26 to retrieve the editing program from the disc storage unit 22 and to merge the corrections with the original input text to produce an edited, updated document stored temporarily in binary digital form on the disc of the storage unit. The latter stored signals representing the updated document are then automatically transmitted from the disc back along the same path over which the input signals passed, to be stored in the same cassette recorder 44, and the updated stored data is also applied by way of the adapter 42 to command the electric typewriter 40 to type out a hard copy version of the updated document.

The latter hard copy may then be again reviewed and edited by repeating the foregoing process, until the contents of the documents are satisfactory. Each successive draft document has its page and line numbers revised automatically by the mini-computer and printed by the typewriter. The central station typically accommodates from 25 to 100 such text input/edit terminals, on a time shared basis.

The next step is to compose the text of the document typographically as a prelude to printing. This step is accomplished by typing on the electric typewriter 40, and recording in cassette recorder 44, typographic commands or formats in the same manner as described above for text corrections, i.e., by reference to the document number, page number and line number. The formats are prepared in advance for a specific type of publications. Composition may be handled like previous corrections, and the commands are preceded by a Begin Correction command. A brief listing of a few typical formats which may be used for publication of a maintenance manual is shown in Table 3.

TABLE 3: TYPICAL TYPOGRAPHIC FORMATS

| | |
|---|---|
| Format 1 (F1) | Global page formats, including: |
| Format 1A (F1A) | 1st page of a section or chapter |
| Format 1B (F1B) | Last page of a section or chapter |
| Format 1C (F1C) | Intermediate pages of a section or chapter |
| Format 2 (F2) | Primary heading within a page |
| Format 3 (F3) | Secondary heading within a page |
| Format 4 (F4) | Tertiary heading within a page |
| Proof Display (PD) | Requests proof display of document (page by page) |
| Proof Print (PP) | Requests proof printout of document |
| Proof Final (PF) | Request final film or paper output |

The formats such as F1A are known global formats, which are applicable throughout a document and which define the general composition characteristics of each page. Global formats may also define procedures for recognizing implicit composition commands. For instance, a double line space in the typed text may be interpreted as a command to begin a new paragraph; the typed sequence character-backspace-underline may be recognized as a command to make the character italic (or, for a different global format, bold-face). Similarly, a typed sequence of double line-space-line beginning with numeral may imply a section title line, to be composed in a different type face.

F1C represents an intermediate page format, which may for example specify the location and dimensions of a lefthand text column, a right-hand text column, a running head or the folio. The type face, type size and line leading for each block are also defined. Within the text columns, formats F2, F3 and F4 would be used to define the typographic specifications of such special blocks as the primary, secondary and tertiary headings.

Table 4A contains a few sample lines from page 1 of an edited manuscript for a maintenance manual. Primary, secondary and tertiary headings are shown. Table 4B illustrates the corresponding typographic format entries which would be made.

TABLE 4: Typographic Format Insertion

A. Edited Manuscript

1. Begin Document No. 1256, Begin Page 1
3. 1. Introduction
4. 1.1 Scope
5. This document describes the maintenance procedures
8. 1.2 Applicable Specifications
9. 1.2.1 Equipment Specifications
10. H1291 . . . . Computer Subsystem B. Typographic Formats 1. Begin Typographic Correction No. 1, No. 1256
2. Insert Format 1,1,1
3. Insert Format 2,1,3
4. Insert Format 3,1,4
5. Insert Format 3,1,8
6. Insert Format 4,1,9
7. End Typographic Correction No. 1, No. 1256

Referring to Table 4B, line No. 1 identifies the typographic formats as typographic correction No. 1 to document No. 1256. Line No. 2 provides for the insertion of a global page format F1 for the complete document. Subsidiary formats F1A, F1B and F1C will be invoked by the computer program at the central station, when required. A variety of these formats would be stored in the disc storage unit 22 at central, and called out when specified by the format signals. Line No. 3 would insert format F2 for use with primary headings preceded by a single number, such as 1. or 1.0. This format would define the type face and type size of the heading and its tab setting. It would also define the tab setting for the text which follows. Lines No. 4 and 5 would insert the format F3 for use with secondary headings preceded by two numerals, such as 1.1 or 1.2. Line No. 6 would insert format F4 for use with tertiary headings preceded by three numerals, such as 1.2.1. Line No. 7 signifies the end of typographic correction No. 1. Application of these typographic formats to the edited text manuscript will yield composed document No. 1256.

When all of these typographic formats have been typed by the electric typewriter and recorded in cassette recorder 4,, the contents of the cassette recorder, containing both the edited manuscript signals and the typographic format signals, is transmitted by the cassette transmitter-receiver 46 to the disc storage unit 22 for temporary storage. Detection of the command "Begin Typographic Corrections" at the central station causes the page composition program to be retrieved from the disc storage unit. This program performs page composition on the text data contained in the disc storage unit, in accordance with the typographic formats specified by the format signal stored therein. It retrieves the specified type face and type size from the disc storage unit for temporary storage in the high-speed memory of the basic processing mini-computer 18. In effect, it locates each typographic block on each page, then justifies and hyphenates each line and block as specified. Finally, the program produces signals representing a document which has been typographically composed and formatted, to drive the precision CRT display device 14 or the CRT scan converter unit 32.

If the "Proof Display" command is then typed on the electric typewriter 40, this command will pass from terminal $T_1$ through communications line 12 to the central station, which responds by selecting the composed document data from the disc storage unit 22 together with the appropriate CRT control program for text, which together act by way of the CRT contRoller 24 to drive the CRT scan converter unit 32. These Signals cause the CRT scan converter unit 32 to reproduce the composed page of text on a two-dimensional charge storage surface therein, and to scan it with a relatively low-resolution facsimile type scan. The latter scanning produces on output lead 52 an electronic analog signal of generally facsimile form, which passes through the CRT controller 24 and through the basic processing mini-computer 18 into temporary storage on disc storage unit 22. Preferably the analog facsimile-type signal is digitized and subjected to information compression before the latter storage. As soon as the communication link is available, the digitized, composed, page signal in disc storage unit 22 is read out at a relatively low rate into the communications link 12, whence it is distributed over telephone line 54 to proof display unit 1 at terminal $T_1$. As will be described more fully hereinafter, proof display unit 1 responds thereto to produce on its CRT storage tube a proof display of the composed page.

The operator at terminal $T_1$ then examines the proof display, and if revisions are necessary, the typographic commands are revised, using the editing commands set forth hereinbefore in Table 1. Another composition/-proofing cycle may then be run until the desired composed page of text is displayed.

When the proof display is satisfactory, a "Print Final" command may be typed into the electric typewriter and thereby sent to the mini-computer 18. The composed page data stored in disc storage unit 22 is thereby commanded to operate the precision CRT display device 14 so as to generate the graphic-arts characters of the text as a series of vertical strokes of bright and dark segments, as described, for example, in the above-cited article in Scientific American. Camera 16 is also commanded over line 60 to photograph the displayed image on photosensitive film, paper or microfilm, as examples. The camera preferably moves the film or paper on a frame-by-frame basis, producing a single page during each exposure. The film or paper cassette obtained from the camera is then processed for subsequent use in plate-making and printing.

Remote terminal $T_2$ (and terminal $T_5$) includes equipment for line-drawing input and revision. Thus if a line drawing is to be part of the publications page, binary digital signals representing such line drawing are developed at terminal $T_2$ and sent to the central station for storage, correction, and subsequent printing or proof display. This process occurs as follows.

A line drawing is provided to the operator for entry into the system by way of the coordinate digitizer 60. Various types of such device are commercially available for the conversion of coordinate positions on a flat surface into digital data representing the $x,y$ coordinates of each such selected point.

One version of such a device consists of a flat sheet of lucite the edges of which contain long strips of a condenser microphone. A pen or pencil containing a controllable spark gap is used to designate any desired point on the surface. When the spark gap is switched on, it generates a high-frequency sound signal which travels from the selected point to the edges of the lucite surface and is detected by the $x,y$ condenser microphone. The minimum elapsed time of travel of the sound wave is proportional to the perpendicular (shortest) distance from the selected point to the edges. This time value is converted into distance and then digitized to represent the $x,y$ coordinates of the point.

The resultant coordinate data is automatically transferred through the adapter 62 to the cassette recorder 64, wherein it is stored. Typically, three types of information are thus digitized and stored: (1) Lines and curves, (2) alphanumeric and graphic symbols, and (3) commands. Lines are digitized by designating the end points thereof with the pen or pencil pointer; curves are digitized by pointing to the end points of the curve and to one or more intermediate points. Symbols are digitally encoded by pointing to a particular square in a matrix containing 50 to 100 such squares, in which square is located the symbol to be selected, and then pointing to the desired location for that symbol on the drawing. The coordinate location of each individual square on the lucite table is interpreted by the mini-computer program at the central station as designating the corresponding symbol. Commands are also digitally encoded in the same manner as "The matrix is typically recorded on a sheet of paper occupying a small portion of the total area of the lucite table, and is usually referred to as a "menu."

To ensure proper interpretation of the digitized data by the mini-computer program, the line drawing and the "menu" are first pasted onto the table, and diagonal corners of each item are then designated with the pointer so as to calibrate the mini-computer program.

Input/edit commands used for text input and shown in Table 1 hereof are employed, except that "Begin Illustration" and "End Illustration" commands are required. Typographic formats are also required, although some different parameters are employed; e.g., line width must be specified as well as character-type face and type-size.

When all or a substantial portion of a line drawing has been digitized and recorded on cassette 64, the data stored therein is read out and transmitted by cassette transmitters 66 over line 67 and through communications link 12 to the central station 10. In response to the "Begin Illustration" command, program controller 26, mini-computer 18 and disc storage unit 22 cause the illustration preparation program to be retrieved from storage in the disc storage unit. This program prepares the illustration in accordance with the typographic formats specified, it causes symbol data to be retrieved from the disc, lines and curves to be drawn as vectors with the desired width and structure, text to be composed as specified, and all standard borders and tables to be retrieved from the disc storage unit. All of this information is automatically merged so that illustration data are finally stored in the disc storage unit representing thefully formatted illustration, and, when commanded, either the precision CRT display device 14 or the CRT scan converter unit 32 is driven by the stored data to reproduce the illustrations.

If the "Proof Display" command is invoked, the formated illustration data and the CRT control program for illustrations are retrieved from the disc storage unit 22 and employed to drive the CRT scan converter unit 12. The output of the scan converter unit on line 52 is handled as in the case of text signals, and transmitted to the proof display unit number 2 at terminal $T_2$. The operator examines the proof display and, if necessary, the data are revised using the editing commands in Table 1 hereof, and another cycle run. This process is continued until the line drawing is as desired. The "Proof Print" command is then entered by the pointer, and the precision CRT display device 14 automatically operates to display the final illustration and to photograph it upon proof paper. The data corresponding to the illustration remains stored in the disc storage unit 32.

Terminal $T_3$ is a photo-input terminal by means of which photographic illustrations may be inserted into the system. A photograph of the desired size is placed in a suitable photoscanner 70, which supplies a binary digital representation of the photograph through adapter 72 to cassette recorder 74 for storage therein. In this example, editing or revision of the photograph is not contemplated. The only input commands required are "Begin Photograph" and "End Photograph," the former command being followed by information identifying the photograph, its dimensions and its screening resolution. The cassette transmitter 76 sends the photograph-representing data through the communications link 12 over line 77 to the central station 10 for temporary storage in disc storage unit 22. The "Begin Photograph" command causes the half-tone CRT control program to be retrieved from the disc storage unit, and this program controls the precision CRT display device 14 or the CRTscan converter unit 32 to write the half-tone photograph thereon as a series of half tone "dot" characters. IF the "Proof Display" command is invoked, the photograph is read out of the scan converter 32 onto line 52 and returned to proof display unit 3 in terminal $T_3$; if the "Proof Print" command is invoked, the photograph is reproduced on the precision CRT device 14 and a paper proof thereof made.

When the composed text, the line drawings and the photographs have been proofed and corrected, and data representing them stored in the disc storage unit 22, the next step is the composition of the page including the text, drawings and photographs. In this example, the page composition or page make-up process is performed with the aid of the coordinate digitizer 60 in terminal $T_2$ and its associated proof display unit. Using the proof display unit 2 as a monitor and the coordinate digitizer 60 as a pointer, the page make-up operator designates the desired location of each illustration or photograph on a page. Text material which is thereby replaced is automatically pushed further along, onto the next page. The completely composed page is thereby presented on the proof display and the correction process is continued until all illustrations have been inserted and the composition is as desired. If any errors are found at this time in text or line drawings, the text or line drawings can be corrected as previously described, and a final composed page again proofed.

The magnetic archival storage unit 30 is provided so that, when a complete composed page has been finally prepared for final printing, the data representative thereof can be read out of the disc storage unit 22 into the archival storage unit where it will be available for use at any future time. Thus, when desired, the data stored in the archival storage unit can again be returned to this storage unit for later proofing and/or printing of the earlier page. The basic elements of the system shown in FIG. 1 are well-known in the art, such as is shown in Raciti, U.S. Pat. No. 3,553,676, issued Jan. 5, 1971.

Figure 2:
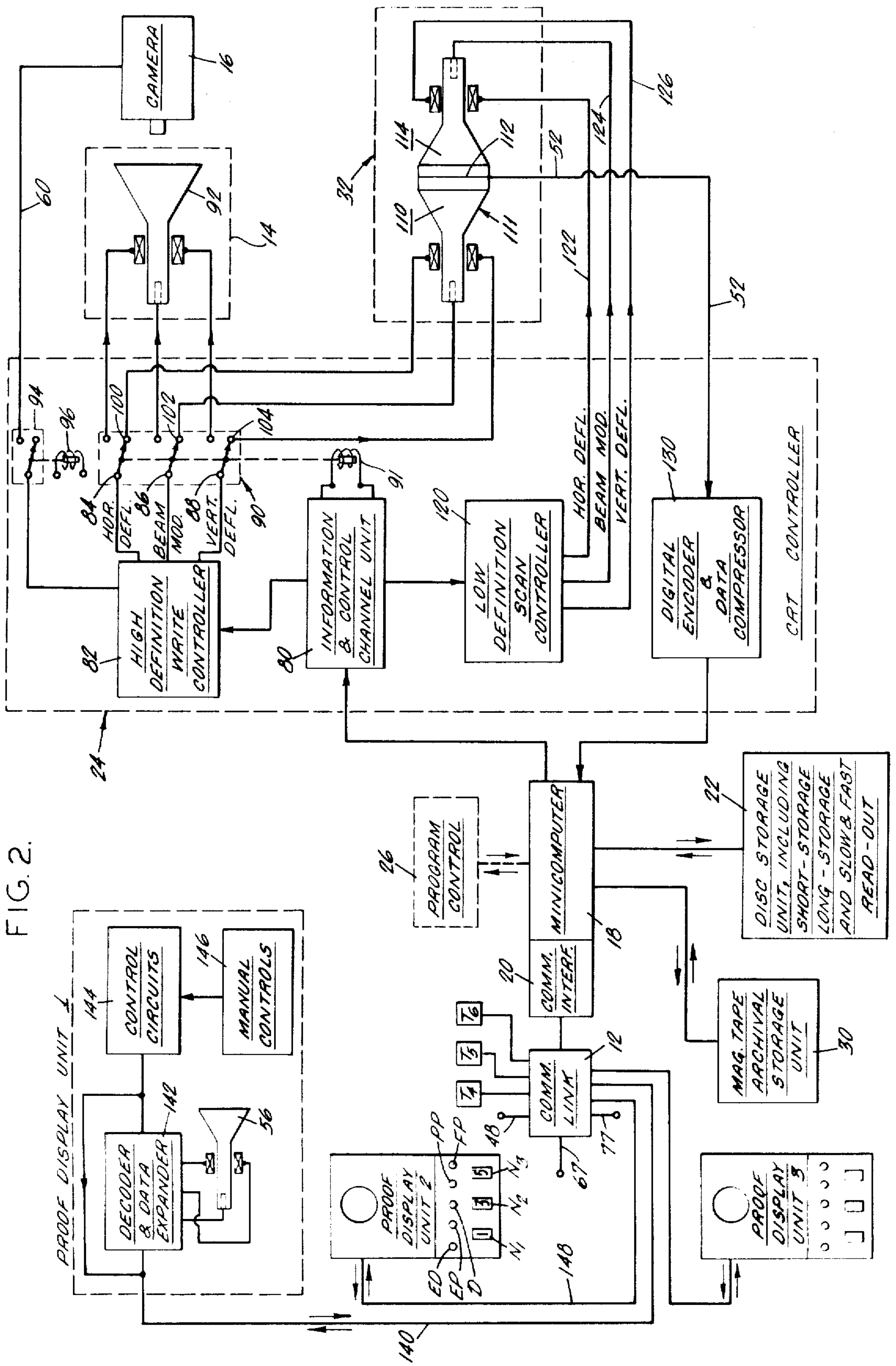
FIG. 2 is a schematic representation, partly in block form, showing in more detail certain portions of the system of FIG. 1.

A major inventive feature of the present invention involves the CRT scan converter unit 32 and the manner in which it is actuated, the proof display units, and the manner in which the output of the scan converter unit is processed to supply proof signals to the proof display units. FIG. 2, in which elements corresponding to those of FIG. 1 are designated by corresponding numerals, shows further details of the electronic proofing arrangement, and in the interest of clarity the data input terminals, except for the proof display units, have been omitted from FIG. 2, and it will be understood that they will be as shown in FIG. 1 in this example.

Referring to FIG. 2, the CRT controller 24 comprises and information and control channel 80 through which publications data are supplied to the high definition write controller 82. Controller 82 supplies horizontal deflection, beam modulation, and vertical control deflection signals to switch terminals 84, 86 and 88, respectively of the three-pole double-throw switch 90, the switch position of which is shown for simplicity as controlled by a solenoid 91 in response to signals from control channel 80; however it will be understood that the switch and the switching control means will normally be of the electronic switching variety, for speed of operation.

When switch 90 is in its upper position (opposite to that shown in the drawing), the horizontal deflection, beam modulation, and vertical deflection signals from terminals 84, 86, and 88 are supplied, respectively, to the horizontal deflection coils, the beam intensity control electrode, and the vertical deflection coils, of the precision cathode-ray tube 92. Camera control lead 60 is connected through single-pole single-throw switch 94 to the write controller 82, the position of the latter switch being shown for simplicity as controlled by the solenoid 96 in response to control signals from unit 80, although again electronic switching arrangements will normally be used for this purpose. When switch 94 is thrown to its upper position (opposite to that shown in the drawing), the camera will be actuated to photograph the display on tube 92.

In normal photo-typesetting operations, when a proof print or final printing is to be produced, the proof print or final print command from a remote terminal is sent to the central station and the computer provides the CRT controller with data representng the image to be formed and with control signals to operate switch 90 to its upper positions. To produce a character on the precision display, the CRT beam is automatically positioned to the desired position at the lower left-hand corner of the character, the data instructs the CRT controller to enter the character mode, and subsequent data are used to deflect the CRT beam and to turn it on and off in a manner which will produce the desired character. The function of the CRT controller in this respect is to interpret the digital data and provide the appropriate horizontal and vertical deflection, as well as the appropriate CRT beam modulations voltages, to produce the desired image on tube 92. Preferably, the image of the character is formed by closely spaced vertical deflections of the cathode-ray beam, the beam being turned on as it traverses a portion of the character and turned off at other times, as shown for example at page 68 of the above cited *Scientific American* article.

The latter operations are performed at very high speeds, a character image being physically produced in about 1 millisecond. Due to the fine detail necessary to produce a high quality graphic-arts character, the amount of data required to reproduce a complete page is very high; for example, in a page containing about 4,000 characters, in excess of 3,000,000 binary bits of data typically must be transmitted from the computer to the CRT controller and thence to the precision cathode-ray tube device 14.

If the publications data-input equipment and its operator were positioned at the same location as the precision cathode-ray tube device 14, proofing could be accomplished by applying the signals to cathode-ray tube 92 to form the page image thereon and viewing the image either directly or through an appropriate arrangement of mirrors, without actuating the camera 16. Alternatively, switch 90 could be actuated by an appropriate "Proof Display" command to operate its contacts to their lower set of positions wherein the switch terminals 100, 102 and 104 are supplied with the horizontal deflection, beam modulation and vertical deflection signals formerly applied to the precision cathode-ray tube, the lines from the latter set of switch terminals then being applied to a monitor cathode-ray tube adjacent the photo-typesetting equipment. However when, in order to time-share the photo-typesetting equipment for purposes of economy, a plurality of remote data-input terminals are utilized, some form of proofing must be provided for the remote operators at each terminal.

In accordance with the invention in this embodiment, the contacts 100, 102 and 104 are supplied to the horizontal deflection, beam modulation and vertical deflection elements of the storage portion 110 of a scan converter tube 111 so as to form on the two-dimensional storage surface thereof a stored-charge version of the page image. The stored-charge image is then scanned by the beam of the scan portion 114 of the scan converter tube, preferably horizontal line by horizontal line in facsimile fashion, to read out the stored information on a line-by-line basis to the output line 52. This scanning is controlled by the low-definition scan controller 120 in response to command and control signals from unit 80, whereby horizontal deflection, beam modulation, and vertical deflection signals are applied over lines 122, 124 and 126, respectively, to the horizontal deflection system, the beam intensity modulating element and the vertical deflection element of the scanning portion of the scan converter tube. The beam modulation is used for blanking during scan retrace, and may also be used to erase the image if the screen is of long persistence and rapid re-use is desired. Such scan converter tubes are well known in the art, and the details of their construction and operation need not be described in detail herein.

The scanning of the stored charge image in the scan converter tube can be relatively coarse compared with the precise scanning used in the precision CRT 92, since the proof-display image need not be of th highest quality. As a result, the quantity of information or data on output line 52 is substantially lower than that which is supplied to the precision CRT 92. Moreover, the facsimile-like signal on line 52 is supplied to a digital encoder and data compressor 130 in the CRT controller, which digitizes the scan converter output signal and applies known data-compression techniques; for example use of "run length" coding techniques, taking into account both horizontal and vertical redundancy in an image, can reduce the quantity of data by a compression factor of 15 to 1. Accordingly, about 300,000 bits can adequately portray a page for proofing purposes. A scan converter and the method for operating a scan converter are well-knwon in the art,as is shown in Pensak, U.S. Pat. No. 2,833,958, issued May 6, 1968.

The signals from digital encoder and data compressor 130 are applied through mini-computer 18 to the disc storage unit 22 for temporary storage and, when the communications link is free, are read-out at a relatively low rate onto the line to the communication link 12. The input instructions commanding the proof display will also include identification of the terminal requesting the proof display, and by known means the proof display supplied to the communications link will then be delivered to the proof display unit of the terminal requesting proofing.

FIG. 2 shows proof display unit 1 in more detail. In this example it comprises a storage cathode-ray tube 56 for presenting the proof image and maintaining it at a useable level over a long period of time, e.g., at least several minutes and preferably of the order of an hour or so, by virtue of its long-persistence screen. The proof display signal supplied thereto over line 140 is supplied to a decoder and data expander 142 to recover a signal like that on scan converter output line 52, and to apply it to the deflection and beam-intensity control means for display tube 56. Suitable control circuits 144 are provided to effect the last-described operations, and also to enable the desired operation of the manual controls 146.

Proof-display unit 2 in FIG. 2 shows one arrangement of manual controls suitable for use at each of the proof-display units. Each of the three rotatable thumb wheels $N_1$, $N_2$ and $N_3$ bears the decimal numbers from 0 through 9, and the three can be set to represent a three-digit document number or page number, such as 135 for example. When a page display is desired, the document number is first entered by means of the three thumb wheels, and the "enter document" pushbutton ED is then pushed whereby the document number is sent over line 148 to the central disc storage unit. The thumb wheels are then adjusted to identify the number of the page to be proofed, and the pushbutton marked ED is pushed to enter the page number of the page to be displayed. The display button marked D is then pushed to signal the central station over line 148 that a proof display is desired. In response to this pushbutton actuation, the electrical switch 90 and 94 in the central station are actuated to the positions shown, and proof-display signals for the selected document and page are returned over lead 148 to form the desired proof display at proof display unit 2. A "Proof Print" push button PP is also provided so that proof printing may be controlled from the same control panel, and a "Final Print" button marked FP also supplied to effect final printing at the central station when this button is actuated. It will be understood that commands for proof print, final print and display can also be typed in at the electric typewriter as described previously, but the above-described manual control arrangement on the proof display unit is convenient for many purposes.

The long-persistence screen used in the proof display unit causes the proof display to persist for a suitably long period as required for proofing, even though the proof display signal supplied thereto appears only momentarily. While separate pushbuttons can be provided to erase the proof display, in the present case it is assumed that operation of the display button causes automatic erasing of the previous proof display image and prepares it for the next display.

It will be appreciated that similar controls are provided on each of the proof display units, so that proof display may be accomplished independently at any of the terminals.

The data signals required to produce the high-precision image at the precision cathode-ray tube 92 may typically require a bandwidth on the order of 6–8 megacycles, producing an image with a definition of about 600 lines; the lower-definition scanning accomplished by the scan converter will typically produce on output line 52 signals representing a lower-definition version of the image, typically requiring a bandwidth of about 3 megacycles and representing an image having a definition of about 200 lines per inch. In passing from the digital encoder and data compressor to the disc storage unit, the proof-signal bit rate is typically about 200,000 bits per second, and after short-term storage in disc storage unit 22 it is read out at a relatively slow rate onto the communication line at about 2,400 bits per second, a rate which is readily accommodated by voice-grade telephone lines. Accordingly, the desired remote proof display is accomplished in an efficient and economical manner.

It is also noted that the connection of the precision CRT to the high-definition write controller 82 need be interrupted in response to a proof-display command only long enough to supply the scan converter with a complete image scan, after which the precision CRT system is again placed on line and available to any of the various terminal units for proof printing or final printing. Furthermore, since the proof-display unit utilizes a storage tube and hence need be supplied with proof signals only momentarily, the proof display signals returned to the communication link need occupy the communication link only for the time required for the requisite number of bits to be transferred. Accordingly, by this method of time sharing, an enhanced degree of accessibility of the central station elements to the remote terminal units is provided.

While in the system shown the precision cathode-ray tube device and the scan converter unit are alternatively supplied with image-forming electrical signals, it is possible to leave both devices connected to the source of deflection and beam modulation signals so that an image is formed on both during both printing and proofing operations, the camera 16, however,only being operated when proof printing or final printing is desired. Also, while the scan converter is shown as reproducing the precision image in stored-charge form in response to electrical signals supplied thereto over appropriate lines, such a stored-charge version of the image can be obtained by other means, for example by utilizing a vidicon or other television camera tube to view the image on the front of the precision CRT through a suitable arrangement of mirrors, the camera tube being internally scanned with a low-definition scan to produce the desired proof signals for delivery to line 52. It is also possible to use a conventional form of facsimile display at each terminal in place of the cathode-ray tube proof-display.

Accordingly, while the invention has been shown and described with particular reference to specific embodiments thereof, it will be understood that it can be embodied in a variety of forms diverse from those specifically shown and described, without departing from the spirit and scope of the invention as defined by the appended claims.

What is claimed is:

1. In an automated publication system of the class comprising a high-precision cathode-ray tube device for forming and displaying a high-definition image of a page means for photographing to provide a hard-copy reproduction of said image, computer means for supplying said tube with deflection and intensity-controlling signals to form said image on said tube, and terminal means remote from said tube for supplying electrical signals to said computer means to cause it to effect formation of said image in accordance with information contained in said electrical signals, the improvement comprising:

scan converter means remote from said terminal means and responsive to said electrical signals for producing at an output terminal thereof output signals representing a lower-definition version of said image, and proof-display means adjacent said terminal means responsive to said output signals for providing a proof display of said lower-definition version of said image.

2. Apparatus in accordance with claim 1, in which said scan converter means comprises a cathode-ray tube scan converter and in which said electrical signals are applied to said cathode-ray tube scan converter to form and store therein a version of said high-definition image, said scan converter means comprising means for scanning said stored version of said image.

3. Apparatus in accordance with claim 2, in which said means for scanning produces a facsimile type of scanning of said stored version of said image and in which said formation of said high-definition image is effected by a type of scanning other than the facsimile type.

4. Apparatus in accordance with claim 1, in which said scan converter means is located adjacent said high-precision cathode-ray tube device.

5. Apparatus in accordance with claim 1, comprising electrical switching means controllable from said remote terminal means alternatively to operate said camera means when said high-definition image is to be photographed or to operate said scan converter means without operating said camera means when a proof display is to be provided at said terminal means.

6. Apparatus in accordance with claim 1, in which said proof display means comprises proof-display cathode-ray tube means supplied with said output signals.

7. Apparatus in accordance with claim 6, in which said proof-display cathode-ray tube means comprises a cathode-ray tube having a display screen with a persistence of at least several minutes.

8. Apparatus in accordance with claim 1, in which said high-precision cathode-ray tube device, said camera means, said computer means and said scan converter means are located together at a common central station, and said remote terminal and said proof-display means are located together at a station remote from said common location, said apparatus comprising a communication link interconnecting said remote station and said central station for supplying information input and commands from said remote station to said central station and for supplying said output signals from said central station to said remote station.

9. Apparatus in accordance with claim 8, comprising signal processing means at said central station for processing said output signals prior to their passage through said communications link to reduce the frequency bandwidth required for their transmission.

10. Apparatus in accordance with claim 9, in which said processing means comprises means for encoding said output signals in binary form.

11. Apparatus in accordance with claim 10, in which said processing means comprises information compressing means for compressing the information in said output signals.

12. Apparatus in accordance with claim 9, in which said processing means comprises means for temporarily storing said output signals and for reading them out at a slow rate to said communication link.

13. Apparatus in accordance with claim 1, in which said electrical signals cause said computer means to develop deflection and intensity-controlling signals representative of a completely composed graphic-arts page, and said output signals are representative of a lower-definition version of said completely-composed page.

14. Apparatus in accordance with claim 13, in which said graphic-arts page includes composed text of more than one type-face and more than one type-size and illustrations interspersed with said text.

15. The method of generating and photographing a high-definition visual image of a graphic-arts page at a central station in response to data input signals, instruction signals and command signals from any of a plurality of remote stations, and of enabling prompt proofing of said image at any of said remote stations, comprising:

transmitting from any of said remote stations, to a storage device at said central station, data input and instruction signals representative of said high-definition image;

transmitting from any of said remote stations to said central station print-command signals when said photographing is desired, to cause said stored data input and instruction signals to produce and photograph said high-definition visual image;

deriving at said central station output signals representing a lower-definition version of said image;

transmitting a proof-command signal from any one of said remote terminals to said central station when a proof-display is desired at that terminal;

sending to said one terminal those of said output signals corresponding to the image produced by signals from said terminal, when said proof-command signal occurs; and producing a proof-display at said one terminal in response to said output signals sent thereto.

16. In an automated publication system of the class comprising a high-precision cathode-ray tube device for forming and displaying an image of a page to be printed, camera means for photographing said image to provide a hard-copy photograph of said image, computer means for supplying said tube with deflection and intensity-controlling signals to form said image on said tube, and terminal means remote from said tube for supplying electrical signals to said computer means to cause it to effect formation of said image in accordance with information contained in said electrical signals, the improvement comprising:

cathode-ray tube scan converter means remote from said terminal means, means for applying deflection and intensity-controlling signals to said scan converter means to record said image thereon and to produce from an output terminal of said converter means output signals representing a lower-definition version of said image, and proof-display cathode-ray tube means adjacent said terminal means responsive to said output signals for providing a proof display of said lower-definition version of said image.

17. Apparatus in accordance with claim 16, in which said computer means for supplying said high-precision cathode-ray tube device with deflection and intensity-controlling signals and said means for applying deflection and intensity-controlling signals to said scan converter comprises a source of said deflection and intensity-controlling signals and electrical switching means for applying said deflection and intensity-controlling signals from said source alternatively to said high-precision cathode-ray tube device and to said scan converter means.

18. Apparatus in accordance with claim 17, comprising control means at said terminal means for controlling said switching means.

19. Apparatus in accordance with claim 16, comprising a digital data communications link connecting said computer means and said output terminal of said scan converter means with said remote terminal means, and digital encoding means for digitally encoding said output signals of said scan converter means prior to their passage through said communications link, said proof-display cathode-ray tube means comprising a proof-display CRT and decoder means for decoding said output signal and for supplying said decoded output signals to said proof-display CRT.

20. Apparatus in accordance with claim 19, in which said system also comprises data compression means for compressing the information in said digitally encoded output signals prior to their application to said communications link, said proof-display cathode-ray tube means comprising data expansion means for expanding the information in said output signal applied thereto prior to its application to said proof-display CRT.

21. Apparatus in accordance with claim 16, in which said terminal means comprises control means for causing said scan converter means to supply said output signals momentarily to said proof-display means, said proof-display means comprising a proof-display cathode-ray tube having a long-persistence image-forming screen whereby the image formed on said proof-display cathode-ray tube persists for at least several minutes after said output signals cease to be supplied to said proof-display means.

22. Apparatus in accordance with claim 16, in which said terminal means comprises a plurality of stations remote from each other, each of said stations including means for controlling said computer means to cause it to effect formation of a different corresponding image on said high-precision cathode-ray tube means, each of said stations comprising proof-display means responsive to said output signals to provide a proof-display.

23. An automated publications system, comprising:

a central station;

a plurality of data-input stations;

an electrical communications link connecting said data-input stations with said central station;

each of said data-input stations comprising a text input terminal and at least one illustration input terminal;

each of said text input terminals comprising means for electrically encoding textual alphanumeric characters, correction instructions, and text composition instructions to produce text-representing signals;

each of said illustration input terminals comprising means for electrically encoding illustration data and correction instructions representative of illustration to be printed, to produce illustration-representing signals;

at least one of said terminals at each of said data-input stations comprising means for electrically encoding page composition data and correction instructions, to produce composition-representing signals;

means for transmitting said text-representing signals, said illustration-representing signals and said composition-representing signals through said communication link to said central station;

said central station comprising computer means; signal storage means for receiving, storing and reading out said illustration-representing signals, said text-representing signals and said composition-representing signals, and format instruction signals; program control means; means for forming a high-definition image of each page to be printed, in response to said text-representing signals, said illustration-representing signals, said composition-representing signals and said format-representing signals stored in said signal storage means; and means for photographing said image in response to a print command from the terminal producing said image;

scan-converter means at said central station responsive to signals stored in said signal storage means for temporarily forming and storing said image and for scanning it in facsimile fashion to produce output signals of facsimile form, representative of a version of said image having lower definition than said high-definition image, in response to a proof-command signal from one of said terminals;

means for encoding said output signals in binary form and for subjecting them to information compression prior to applying them to said communication link;

proof-display means at each of said terminals connected to said communication link to receive said output signals produced in response to a proof command therefrom; each said proof-display means comprising a display cathode-ray tube having a screen persistence of at least several minutes, means for encoding and expanding the information in said output signal supplied thereto, and means for forming a proof-display of a composed page in response to said decoded, information-expanded output signal supplied thereto.

* * * * *